US010416937B2

(12) United States Patent
Sasaki

(10) Patent No.: US 10,416,937 B2
(45) Date of Patent: Sep. 17, 2019

(54) IMAGE FORMING APPARATUS, IMAGE FORMING METHOD, AND STORAGE MEDIUM

(71) Applicant: CANON KABUSHIKI KAISHA, Tokyo (JP)

(72) Inventor: Yuto Sasaki, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/657,943

(22) Filed: Jul. 24, 2017

(65) Prior Publication Data

US 2018/0032292 A1   Feb. 1, 2018

(30) Foreign Application Priority Data

Jul. 26, 2016   (JP) ................. 2016-146610

(51) Int. Cl.
*G06F 3/12*     (2006.01)
*H04N 1/00*     (2006.01)

(52) U.S. Cl.
CPC .......... *G06F 3/1225* (2013.01); *G06F 3/1204* (2013.01); *G06F 3/1205* (2013.01); *G06F 3/1227* (2013.01); *G06F 3/1247* (2013.01); *G06F 3/1258* (2013.01); *H04N 1/00482* (2013.01); *H04N 1/00938* (2013.01); *H04N 2201/0094* (2013.01)

(58) Field of Classification Search
CPC .... G06F 3/1225; G06F 3/1204; G06F 3/1205; G06F 3/1227; G06F 3/1247; G06F 3/1258; H04N 1/00482; H04N 1/00938; H04N 2201/0094
See application file for complete search history.

(56) References Cited

U.S. PATENT DOCUMENTS

| | | | |
|---|---|---|---|
| 2005/0141012 A1* | 6/2005 | Oomura ............... | G06K 15/00 358/1.14 |
| 2007/0008573 A1 | 1/2007 | Yamada | |
| 2009/0251713 A1* | 10/2009 | Funane ............... | H04N 1/00344 358/1.9 |
| 2011/0058205 A1 | 3/2011 | Araki | |
| 2011/0295695 A1* | 12/2011 | Ishihara ............. | G06Q 30/0269 705/14.66 |
| 2012/0147411 A1* | 6/2012 | Mori .................... | G06F 3/1205 358/1.14 |
| 2013/0016393 A1* | 1/2013 | Oku ..................... | G06F 3/1207 358/1.15 |
| 2013/0063772 A1* | 3/2013 | Bae ..................... | G06F 3/1204 358/1.15 |
| 2013/0174141 A1 | 7/2013 | Hirokawa et al. | |

FOREIGN PATENT DOCUMENTS

| CN | 102349070 A | 2/2012 |
|---|---|---|
| JP | 2006048725 A | 2/2006 |

* cited by examiner

*Primary Examiner* — Iriana Cruz
(74) *Attorney, Agent, or Firm* — Canon U.S.A., Inc. IP Division

(57) ABSTRACT

An image forming apparatus displays, for example, a setting screen as a screen for selecting an application corresponding to an icon selected on a main menu screen. The setting screen displays image processing icons for selecting existing applications and an extended image processing icon for selecting an application added as a plug-in.

8 Claims, 15 Drawing Sheets

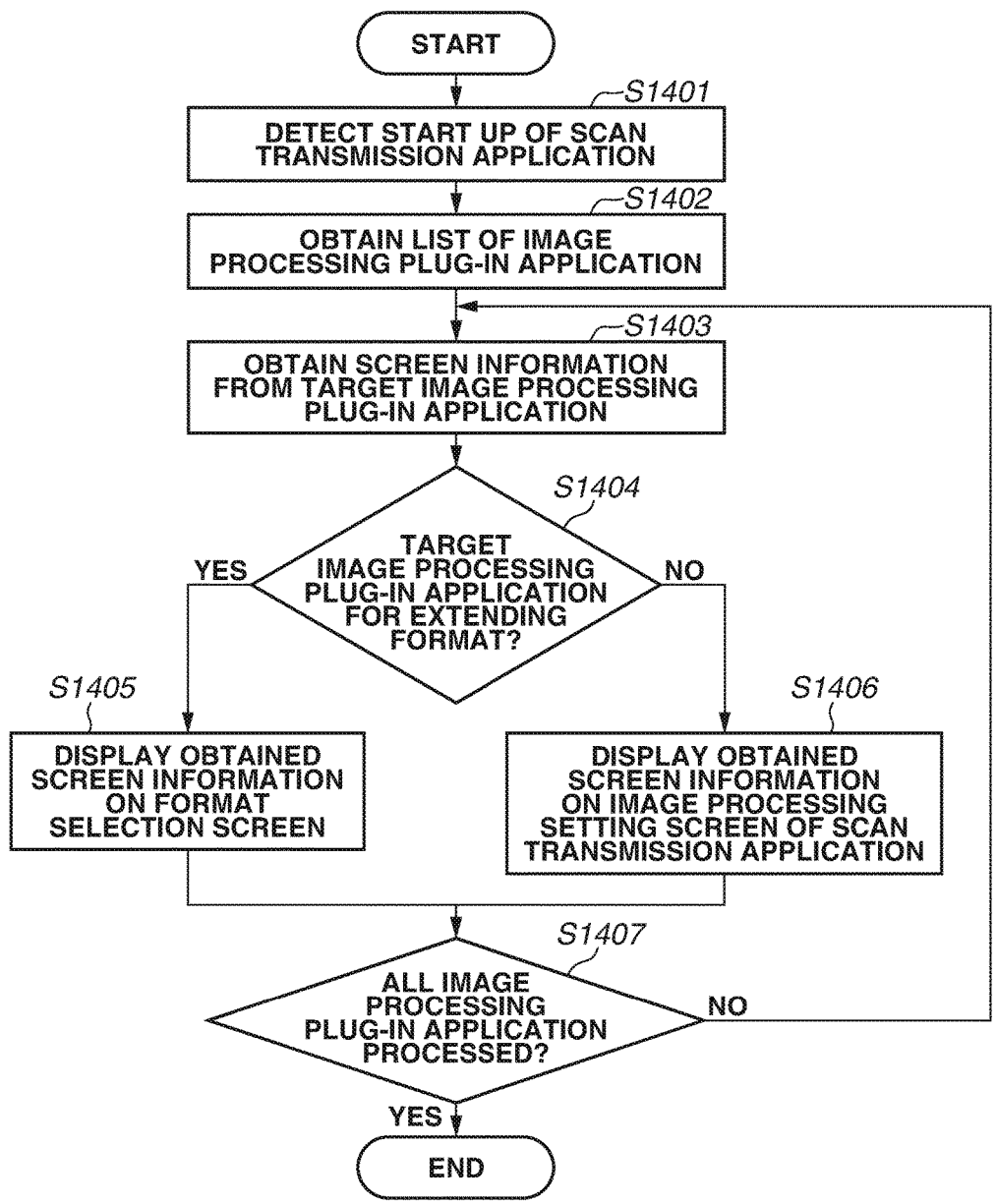

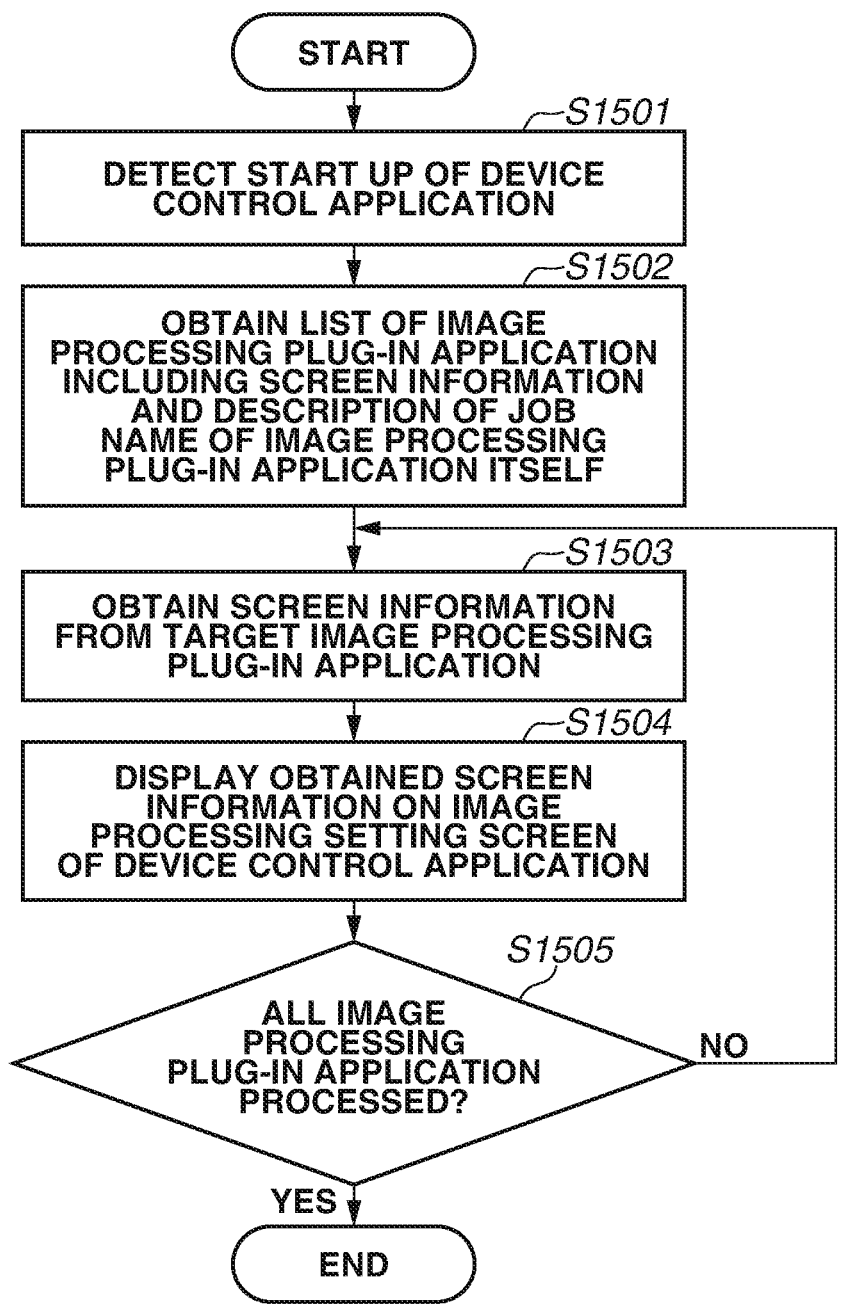

IMAGE FORMING APPARATUS, IMAGE FORMING METHOD, AND STORAGE MEDIUM

BACKGROUND

Field

The present disclosure relates to an image forming apparatus, an image forming method, and a program, and is especially suitable for use in execution of a job in the image forming apparatus.

Description of the Related Art

Japanese Patent Application Laid-Open No. 2006-48725 describes a technique for executing various jobs including image processing which is not provided in an image forming apparatus at the time of shipment from the factory. Japanese Patent Application Laid-Open No. 2006-48725 describes a technique which transfers a mobile agent for performing processing on print data as proxy to an image forming apparatus including a resident agent (a printer control object and an image scanner control object).

However, in a configuration described in Japanese Patent Application Laid-Open No. 2006-48725, the mobile agent and the resident agent independently exist. As a result, the mobile agent and the resident agent can use a common control library but cannot operate in cooperation with each other. Therefore, when new image processing is inserted into a job in the configuration of Japanese Patent Application Laid-Open No. 2006-48725, it is necessary to generate a program for executing the job including the new image processing as a plug-in application and install the plug-in application in the image forming apparatus. In this case, the resident application, and the plug-in application exist, and screen information of the resident application and screen information of the plug-in application for realizing the new image processing both exist in the image forming apparatus. Accordingly, when performing a setting of a job, a user needs to determine whether to use the resident agent or to use the plug-in application based on the type of processing to be executed. Thus, there is a concern that user convenience could be lowered.

SUMMARY

Various embodiments of the present disclosure are directed to facilitating a setting of a job including processing added to an image forming apparatus, in consideration of the above-described issues.

According to various embodiments, an image forming apparatus includes the following configurations. Specifically, the image forming apparatus includes a storage unit configured to store a device control application that causes the image forming apparatus to execute a job, a memory device that stores a set of instructions, and at least one processor that executes the instructions to control the storage unit to store an image processing plug-in application for extending the device control application, wherein the image processing plug-in application includes screen information relating to a user interface to be displayed on a display, regarding a function to be extended by the image processing plug-in application.

Further features will become apparent from the following description of exemplary embodiments with reference to the attached drawings.

BRIEF DESCRIPTION OF THE DRAWINGS

FIG. 14 is a flowchart illustrating third processing of the image forming apparatus according to one embodiment.

FIG. 15 is a flowchart illustrating fourth processing of the image forming apparatus according to one embodiment.

DESCRIPTION OF THE EMBODIMENTS

Various exemplary embodiments will be described in detail below with reference to the attached drawings.

First, a first exemplary embodiment is described.

Figure 1:
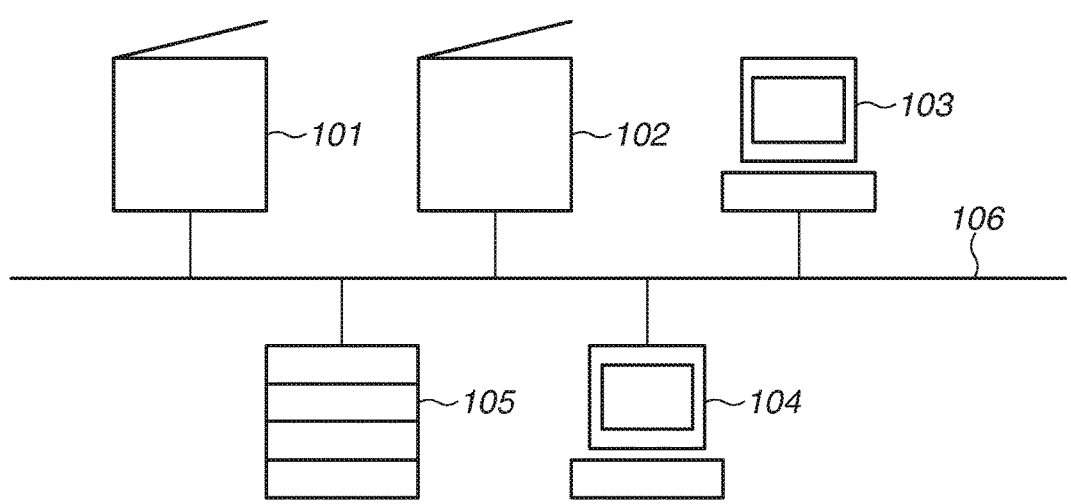
FIG. 1 illustrates a configuration of an image forming system according to one embodiment.

FIG. 1 illustrates an example of a configuration of an image forming system. The image forming system includes image forming apparatuses 101 and 102, information processing terminals 103 and 104, and a server 105. The image forming apparatuses 101 and 102, the information processing terminals 103 and 104, and the server 105 are connected and can communicate with each other via a network 106. In FIG. 1, two image forming apparatuses 101 and 102 are illustrated as an example, however, an arbitrary number (one or more than two) of the image forming apparatuses can be included. Further, each of the image forming apparatuses 101 and 102 can be realized by the same apparatus. Therefore, the image forming apparatus 101 is described below as a representative of the image forming apparatuses 101 and 102 and detailed descriptions of the image forming apparatus 102 are omitted. The network 106 may be any network, such as a local area network (LAN) and Internet, which enables the apparatuses in the image forming system to communicate with each other.

The image forming apparatus 101 can receive a print request of image data (print data) from the information processing terminals 103 and 104 and print the received data, read image data by a scanner provided in the image forming apparatus 101, and print the image data read by the scanner. The image forming apparatus 101 can store the print data received from the information processing terminals 103 and 104 and transmit an image read by the scanner of the image forming apparatus 101 to the information processing terminals 103 and 104. Further, the image forming apparatus 101 can perform image processing using the server 105 and print a document stored in the server 105. In addition, the image forming apparatus 101 can realize functions of a known image forming apparatus such as a multifunction peripheral (MFP).

Figure 2:
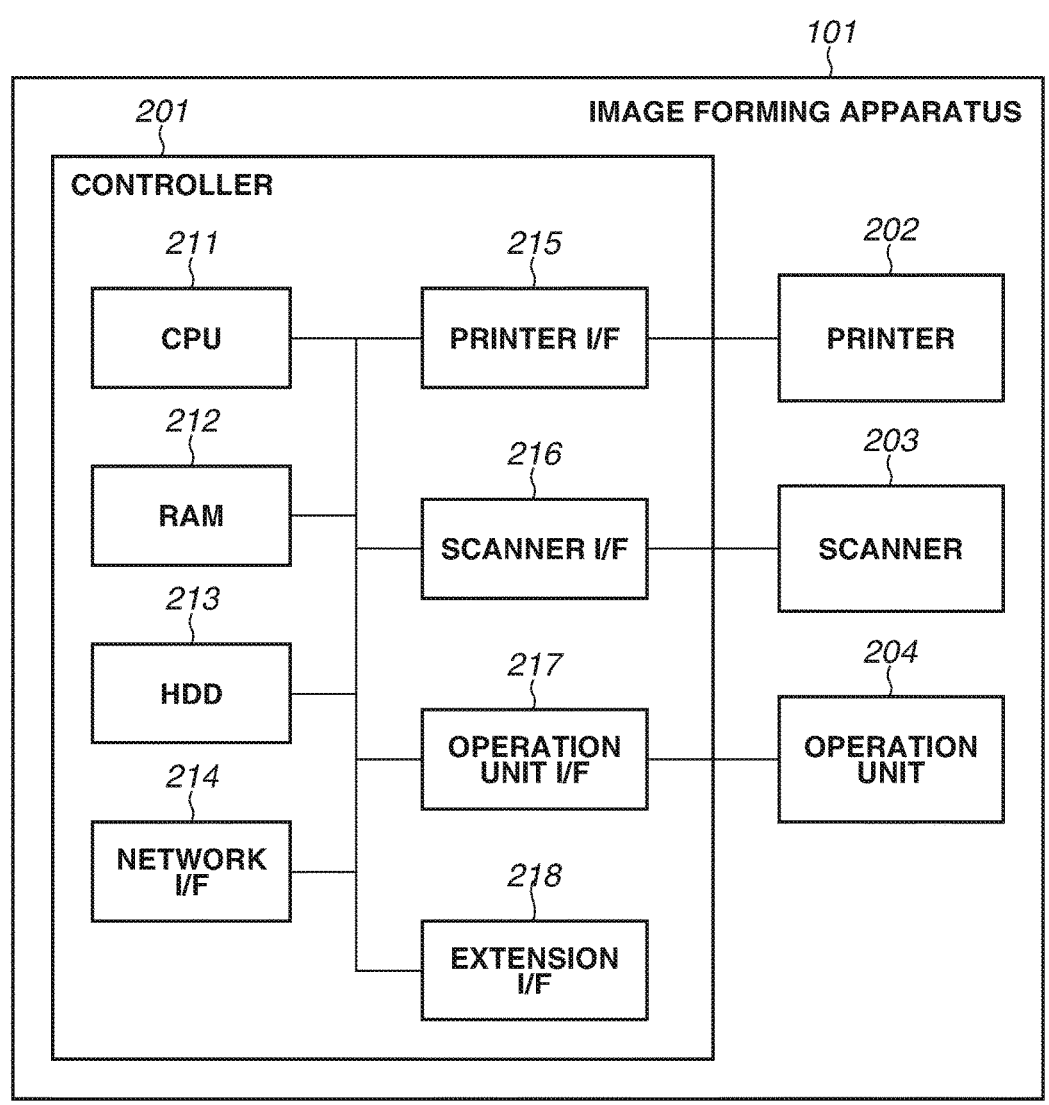
FIG. 2 illustrates a configuration of an image forming apparatus according to one embodiment.

FIG. 2 illustrates an example of a configuration of the image forming apparatus 101.

The image forming apparatus 101 includes a controller 201, a printer 202, a scanner 203, and an operation unit 204. The controller 201 includes a central processing unit (CPU) 211, a random access memory (RAM) 212, a hard disk drive (HDD) 213, a network interface (I/F) 214, a printer I/F 215, a scanner I/F 216, an operation unit I/F 217, and an extension I/F 218. The CPU 211 can exchange data with the RAM 212, the HDD 213, the network I/F 214, the printer I/F 215, the scanner I/F 216, the operation unit I/F 217, and the extension I/F 218. Further, the CPU 211 develops a command read from the HDD 213 in the RAM 212 and executes the command developed in the RAM 212.

The HDD 213 can store a command executable by the CPU 211, a setting value used in the image forming apparatus 101, data regarding processing requested from a user, and the like. The RAM 212 is an area for temporarily storing a command read from the HDD 213 by the CPU 211. The RAM 212 can store various data pieces necessary for executing a command. The network I/F 214 is an interface for performing network communication with the apparatuses in the image forming system. The network I/F 214 can transmit a fact of data reception to the CPU 211 and transmit data on the RAM 212 to the network 106.

The printer I/F 215 can transmit print data transmitted from the CPU 211 to the printer 202 and transmit a printer state received from the printer 202 to the CPU 211. The scanner I/F 216 can transmit an image reading instruction transmitted from the CPU 211 to the scanner 203, transmit image data received from the scanner 203 to the CPU 211, and transmit a state received from the scanner 203 to the CPU 211.

The operation unit I/F 217 can transmit a user instruction input from the operation unit 204 to the CPU 211 and transmit screen information for a user to operate to the operation unit 204. The extension I/F 218 is an interface that enables the image forming apparatus 101 to connect to an external apparatus. The extension I/F 218 includes, for example, a universal serial bus (USB) type interface. An external storage device such as a USB memory is connected to the extension I/F 218, and thus the image forming apparatus 101 can read data stored in the external storage device and write data to the external storage device.

The printer 202 can print image data received from the printer I/F 215 on a sheet and transmit a state of the printer 202 to the printer I/F 215. The scanner 203 can read and digitalize information displayed on a sheet placed on the scanner 203 according to an image reading instruction received from the scanner I/F 216 and transmit the digitalized information to the scanner I/F 216. Further, the scanner 203 can transmit a state of itself to the scanner I/F 216. The operation unit 204 is an interface for enabling a user to perform an operation for issuing various instructions to the image forming apparatus 101. For example, the operation unit 204 includes a liquid crystal screen having a touch panel and provides an operation screen for a user and receives an operation from the user.

Figure 3:
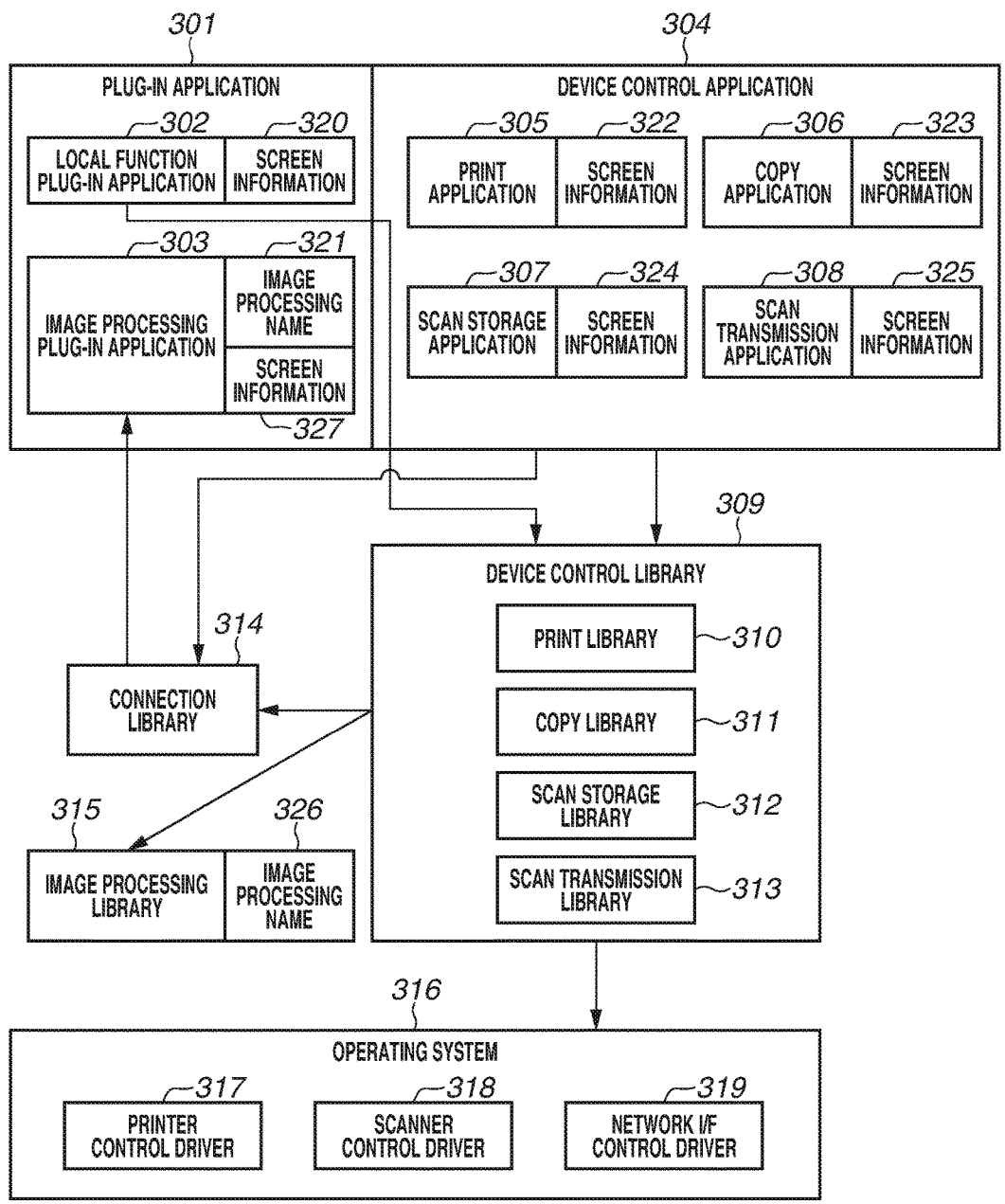
FIG. 3 illustrates a structure of software in the image forming apparatus according to one embodiment.

FIG. 3 is a hierarchical chart schematically illustrating an example of a structure of software processed by the CPU 211. The software including the structure illustrated in FIG. 3 is constituted using, for example, a program stored in the HDD 213 of the image forming apparatus 101. In FIG. 3, the structure has a relationship in which a high-order hierarchy uses a service provided by a low-order hierarchy with some exceptions.

In FIG. 3, a lowermost hierarchy includes an operating system 316 and manages program execution, a memory, and the like. A printer control driver 317, a scanner control driver 318, and a network I/F control driver 319 are built in the operating system 316. The printer control driver 317, the scanner control driver 318, and the network I/F control driver 319 can function by mutually cooperating with each other. The printer control driver 317 is software for controlling the printer 202 via the printer I/F 215. The scanner control driver 318 is software for controlling the scanner 203 via the scanner I/F 216. The network I/F control driver 319 is software for controlling the network I/F 214.

A second hierarchy from the lowermost hierarchy includes a device control library 309. The device control library 309 is statically or dynamically linked to a local function plug-in application 302 or a device control application 304 described below. Further, the device control library 309 controls the operating system 316 based on an instruction from each application program. Furthermore, the device control library 309 requests a connection library 314 and an image processing library 315 to perform image processing. An example of a series of flows for requesting the image processing is described below.

Next, an example of the device control library 309 is described.

A print library 310 provides an application programming interface (API) for controlling a print job using a function of the printer control driver 317. A print job represents a series of processing including printing of print data stored in the HDD 213 of the image forming apparatus 101 and printing of print data received from an external apparatus via the network I/F 214. The external apparatus can be, for example, one of the information processing terminals 103 and 104.

A copy library 311 provides the API for controlling a copy job using functions of the scanner control driver 318 and the printer control driver 317. A copy job represents a series of processing for printing image data scanned by the scanner 203 by the printer 202.

A scan storage library 312 provides the API for controlling a scan storage job using a function of the scanner control driver 318. A scan storage job represents a series of processing for converting image data scanned by the scanner 203 into print data or a general-purpose format and then storing the converted data in the HDD 213 or the external storage device such as a USB connected the extension I/F 218. A general-purpose format is a data format, such as a Portable Document Format (PDF) and a Joint Photographic Experts Group (JPEG). In addition, the general-purpose format may be a Tagged Image File Format (TIFF) or XML Paper Specification (XPS).

A scan transmission library 313 provides the API for controlling a scan transmission job using functions of the scanner control driver 318 and the network I/F control driver 319. A scan transmission job represents a series of processing for converting image data scanned by the scanner 203 into a general-purpose format, and then transmitting the general-purpose format to a file server via the network I/F 214 or to the external apparatus by attaching to an electronic mail. The file server is, for example, the server 105, and the external apparatus can be, for example, one of the information processing terminals 103 and 104.

The second hierarchy from the lowermost hierarchy further includes the connection library 314 and the image processing library 315.

The image processing library 315 provides the API for executing various types of image processing executed by the CPU 211. The various types of the image processing described here represent processing which can be used in the image forming apparatus 101 from the time of shipment from the factory. The relevant image processing includes, for example, processing for converting image data input to the image forming apparatus 101 into a general-purpose format, sharpness processing, and page aggregation. One or more image processing libraries 315 may be stored in the image forming apparatus 101. Each image processing library 315 includes a specific image processing name 326. For example, the image processing library 315 having a sharpness function includes Sharpness as the image processing name 326. The image processing name 326 is used as an identifier for the device control library 309 to identify a plurality of the image processing libraries 315.

The connection library 314 issues an execution instruction to an image processing plug-in application 303 installed in the image forming apparatus 101 in response to an image processing execution request from the device control library 309. The connection library 314 is statically or dynamically linked to the image processing plug-in application 303. The connection library 314 is also linked to the device control application 304 described below. The connection library 314 can transmit a list of executable image processing plug-in applications 303 to the device control application 304. The list of the image processing plug-in applications 303 includes, for example, an image processing name 321 and screen information 327 of each of one or a plurality of the image processing plug-in applications 303 installed in the image forming apparatus 101.

An uppermost hierarchy is an application hierarchy which includes a plug-in application 301 and the device control application 304. The device control application 304 provides various functions by calling each API of the device control library 309. The device control application 304 causes the image forming apparatus to execute a job. The device control application 304 is a resident application stored in the HDD 213. The device control application 304 can extend a function thereof by upgrade of firmware. A print application 305, a copy application 306, a scan storage application 307, and a scan transmission application 308 included in the device control application 304 respectively include screen information pieces 322, 323, 324, and 325. The CPU 211 displays each of the screen information pieces 322, 323, 324, and 325 on the operation unit 204 via the operation unit I/F 217. The device control application 304 can request the connection library 314 to obtain the list of the image processing plug-in applications 303 (the list including, for each of the image processing plug-in applications 303, the image processing name 321 and the screen information 327). This processing is used for processing for displaying the screen information for enabling the image processing plug-in application 303 installed in the image forming apparatus 101 on a screen of the device control application 304 described below. The image processing plug-in application 303 is an application for extending the device control application. The image processing plug-in application 303 includes the screen information 327 regarding a function to be extended by the image processing plug-in application.

Figure 4:
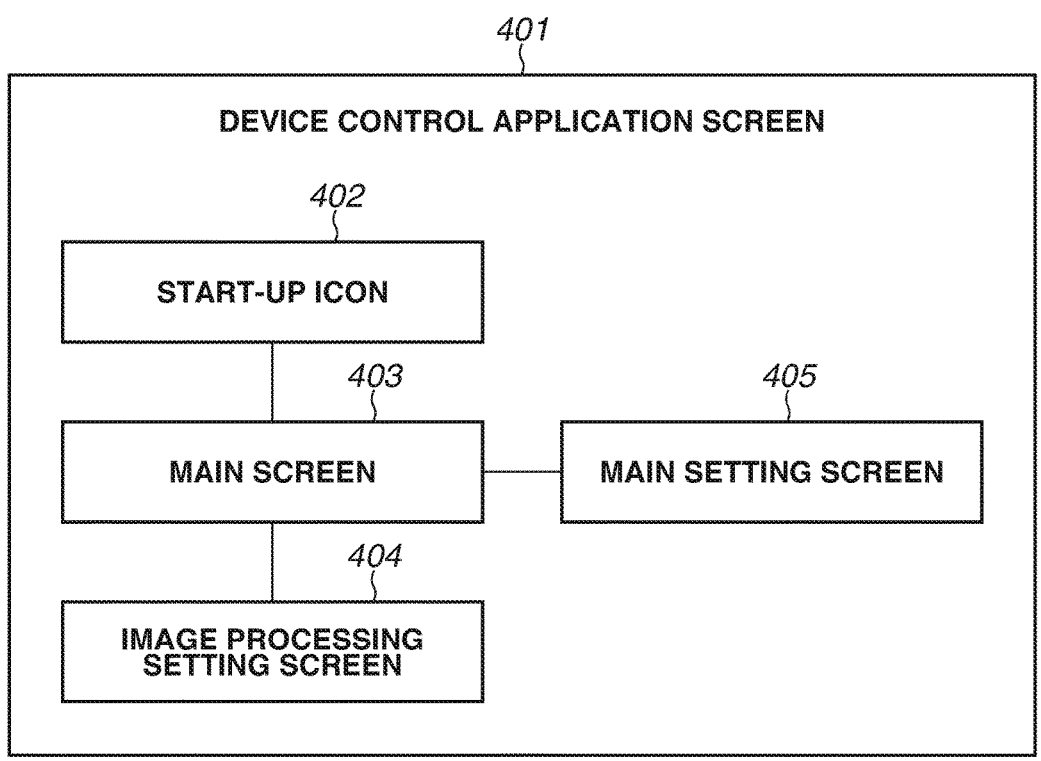
FIG. 4 illustrates a device control application screen according to one embodiment.

An example of contents of the screen information pieces 322, 323, 324, and 325 of the device control application 304 is described with reference to FIG. 4.

For example, the screen information 322 includes the screen information for displaying respective screens of a start-up icon 402, a main screen 403, a main setting screen 405, and an image processing setting screen 404. The same can be applied to the screen information pieces 323, 324, and 325. In the following description, the start-up icon 402, the main screen 403, the main setting screen 405, and the image processing setting screen 404 are collectively referred to as a device control application screen 401 as needed for ease of description.

The start-up icon 402 is displayed on a main menu screen displayed on the operation unit 204 after the start-up of the image forming apparatus 101. When pressing of the start-up icon 402 is detected, the CPU 211 issues a start-up instruction to the device control application 304 corresponding to the icon.

The main screen 403 is a top screen of the device control application 304 which is displayed on the operation unit 204 after the start-up instruction. The image processing setting screen 404 is used when image processing is set for each job. The main setting screen 405 is used for performing a setting specific to the device control application 304. The main setting screen 405 is, for example, a screen for setting a destination in the scan transmission application 308 and a screen for setting printing in the copy application 306. When a setting to the screen information pieces 322, 323, 324, and 325 by a user operation is detected, the CPU 211 writes a content of the setting into the RAM 212.

The device control application 304 assigns an image processing name to a setting of each job in response to an operation to the image processing setting screen 404. In this regard, a user selects the image processing by pressing the operation unit 204, and thus the device control application 304 can assign the image processing name to the setting of each job. Further, the device control application 304 can automatically set the image processing name to the image processing necessary for each job.

In addition, not only the device control application 304 but also the device control library 309 can set the image processing name. As a case when the device control library 309 sets the image processing name, for example, when there is image processing necessary for the device control library 309 to control the operating system 316, the image processing name may be set to the relevant image processing. When a plurality of the image processings is used in a job, the image processing name corresponding to each image processing is set (i.e., a plurality of the image processing names is set). Further, when an application accompanied with image processing (i.e., performing the image processing) such as the image processing plug-in application 303 is not selected in the execution of a job, the image processing name is not set. The CPU 211 (the device control application 304) detects an instruction to execute a job based on an operation by a user on the operation unit 204 and starts the job by calling the API of the device control library 309. Examples of a setting method of a job and a setting method of the image processing are specifically described below.

Next, an example of the device control application 304 is described. The print application 305 executes a print job by calling the API of the print library 310. The copy application 306 executes a copy job by calling the API of the copy library 311. The scan storage application 307 executes a scan storage job by calling the API of the scan storage library 312. The scan transmission application 308 executes a scan transmission job by calling the API of the scan transmission library 313.

Next, an example of the plug-in application 301 is described. The plug-in application 301 is an application which can be installed and uninstalled as a plug-in separately from the device control application 304 which is the resident application. The plug-in application 301 includes the local function plug-in application 302 and the image processing plug-in application 303. The plug-in application 301 includes programs necessary for each operation as a package. The plug-in application 301 is installed in the image forming apparatus 101 using a remote user interface (UI) and the like. The remote UI is a mechanism which can access the image forming apparatus 101 from a Web browser in the external apparatus via the network I/F 214 and perform confirmation of a state of the image forming apparatus 101, operation of a print job, various settings, and the like. The external apparatus is, for example, one of the information processing terminals 103 and 104. Each of the plug-in applications 301 (the local function plug-in application 302 and the image processing plug-in application 303) can independently start and stop. The local function plug-in application 302 operates independently from the device control applications 305, 306, 307, and 308.

An example of a series of processing steps from installation, start-up, stop, to uninstallation of the plug-in application 301 is provided next.

When installation of the plug-in application 301 is detected, the CPU 211 stores information of the relevant plug-in application 301 in the HDD 213. Subsequently, when a start instruction to the plug-in application 301 is detected, the CPU 211 issues a start-up instruction to the relevant plug-in application 301. The plug-in application 301 can execute a content of each program during the start-up thereof. Subsequently, when a stop instruction to the plug-in application 301 is detected, the CPU 211 issues the stop instruction to the relevant plug-in application 301. Further, when an uninstallation instruction to the plug-in application 301 is detected, the CPU 211 deletes the information of the plug-in application 301 from the HDD 213. The instructions can be issued from, for example, the remote UI and the operation unit 204, however, the instructions may be issued by another method.

Next, an example of the local function plug-in application 302 is described. The local function plug-in application 302 includes screen information 320. The local function plug-in application 302 can provide a user with a function and a screen different from those of the resident device control application 304 by calling the API of the device control library 309. For example, the local function plug-in application 302 can provide a function by combining a plurality of functions, such as copying, scanning, and transmitting certain image data. Further, when a setting of the image processing based on an operation by a user with respect to the screen information 320 is detected, the local function plug-in application 302 sets an image processing name corresponding to the image processing to the job setting. The local function plug-in application 302 can set an image processing name corresponding to the image processing to be realized by default if there is no explicit setting from a user. The local function plug-in application 302 may not have a function for performing the image processing. In this case, a setting of the image processing is not performed.

Next, an example of the image processing plug-in application 303 is described. The image processing plug-in application 303 provides specific image processing. One or more image processing plug-in applications 303 may be stored in the image forming apparatus 110. The specific image processing described here represents image processing to be extended separately from the image processing library 315. For example, the specific image processing includes processing such as format conversion, tilt correction, and generation of translation data after optical character recognition (OCR) with respect to an input image. The processing is executed following execution of processing by the device control application specified via a main menu screen 601.

The image processing plug-in application 303 itself may not have an image processing function. For example, when the server 105 includes an image processing program therein, the image processing plug-in application 303 can transmit an instruction for image processing to the server 105 via the network I/F 214 and thus realize the image processing. Each of the image processing plug-in applications 303 stores the image processing name 321 as an identifier for identifying a content of the image processing executed by itself. For example, the image processing plug-in application 303 for performing the tilt correction, "Tilt-Correct", is set with the image processing name 321. The image processing name 321 is specific, and a plurality of the image processing plug-in applications 303 having the same image processing name 321 does not exist in the HDD 213 of the image forming apparatus 101. In other words, the image processing plug-in application 303 having the same image processing name 321 as that of the image processing plug-in application 303 already installed in the image forming apparatus 101 cannot be installed in the image forming apparatus 101. When requesting the connection library 314 to perform the image processing, the device control library 309 sets the image processing name and a detailed parameter for processing. The connection library 314 instructs the image processing plug-in application 303 to execute the processing based on the image processing name set to the job. An example of a method for calling the image processing plug-in application 303 is specifically described below with reference to a flowchart in FIG. 11.

A part that the connection library 314 instructs the image processing plug-in application 303 to execute the processing for corresponds to a part that a low-order module can call a high-order module in FIG. 3. The image forming apparatus 101 can recognize the image processing plug-in application 303 by installing the image processing plug-in application 303 in the image forming apparatus 101 and starting up the application using the remote UI and the like as with the plug-in application 301.

Figure 5:
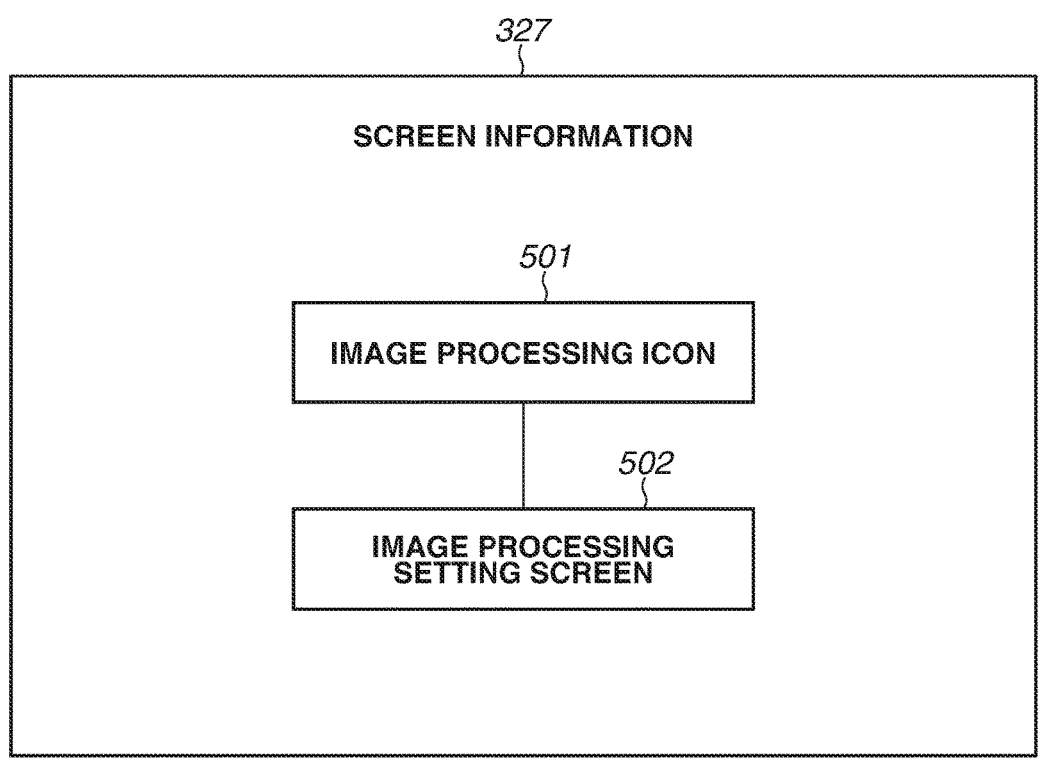
FIG. 5 illustrates contents of screen information of an image processing plug-in application according to one embodiment.

The image processing plug-in application 303 stores the screen information 327. FIG. 5 illustrates an example of contents of the screen information 327 of the image processing plug-in application 303. The screen information 327 of the image processing plug-in application 303 includes image information pieces of an image processing icon 501 and an image processing setting screen 502. The screen information 327 is used for generating the device control application screen 401 when the device control application 304 is started up. An example of a generation method of the device control application screen 401 is specifically described below. The image processing plug-in application 303 can store each of the image processing icon 501 and the image processing setting screen 502 as image data. In addition, the image processing plug-in application 303 may respectively store the image processing icon 501 and the image processing setting screen 502 as text data pieces and dynamically generate a screen based on the text data when an actual screen is generated. The text data may include, for example, Extensible Markup Language (XML) or Hyper Text Markup Language (HTML). The image processing icon 501 and the image processing setting screen 502 may have configurations other than the above-described one.

In the above-described example, for example, the device control application 304 is stored in the HDD 213, and thus an example of first storing processing is realized for storing a first application used for executing a job by the image forming apparatus. The image processing library 315 and the image processing name 326 are stored in the HDD 213, and thus an example of a second storing processing is realized. Further, for example, the plug-in application 301 stored in an external storage medium or a storage device is installed, and thus an example of obtaining processing is realized for obtaining a third application used for causing the image forming apparatus or the external apparatus to execute processing. Further, for example, the installed plug-in application 301 is stored in the HDD 213, and thus an example of third storing processing is realized. Further, for example, an example of information for selecting the first processing is realized by an icon included in the image processing setting screen 404. Further, for example, an example of information for selecting the second processing is realized by the image processing icon 501. Further, for example, an example of information of a second screen for performing a setting regarding the second processing executed by the third application is realized by the image information of the image processing setting screen 502. Further, for example, an example of identification information of the second processing executed by the third application is realized by the image processing name 321. The information may be stored in a storage medium or a storage device other than the HDD 213.

Next, an example of processing is described which is performed when the image forming apparatus 101 is started up.

Figure 6:
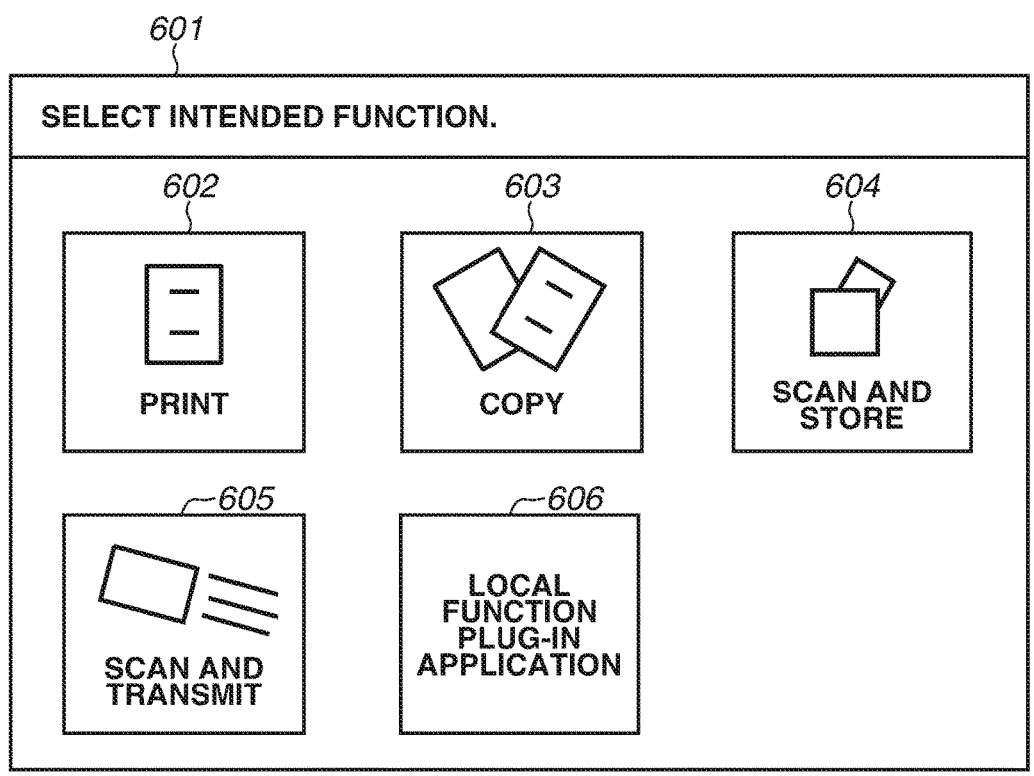
FIG. 6 illustrates a main menu screen according to one embodiment.

FIG. 6 illustrates an example of the main menu screen 601. The main menu screen 601 is a selection screen for selecting the device control application. The main menu screen 601 is displayed on the operation unit 204. When the image forming apparatus 101 is started up, the CPU 211 obtains the device control application 304 constituting the main menu from the HDD 213. Further, the CPU 211 obtains the start-up icon 402 of the device control application 304 and displays the icon on the main menu screen 601. In FIG. 6, a print icon 602, a copy icon 603, a scan storage icon 604, and a scan transmission icon 605 are examples of the start-up icon 402 illustrated in FIG. 4. A start-up icon 606 of the local function plug-in application 302 can be displayed on the main menu screen 601 in addition to the start-up icons 402 of the resident device control application 304. As described above, the image forming apparatus 101 can display a user interface corresponding to the local function plug-in application on the selection screen for selecting the device control applications 602 to 605.

When the image forming apparatus 101 is started up, the CPU 211 obtains the start-up icon 606 as the screen information 320 of the local function plug-in application 302 from the plug-in application 301 and displays the icon on the main menu screen 601. As described above, the start-up icon 606 of the local function plug-in application 302 is included in the screen information 320 of the local function plug-in application 302. When pressing of the start-up icon 606 of the local function plug-in application 302 is detected, the CPU 211 starts up the local function plug-in application 302.

Next, an example of processing is described which is performed when the device control application 304 inserts the screen information for enabling the image processing plug-in application 303 into the device control application screen 401 of itself. The copy application 306 is described as a specific example of the device control application 304. First, an example of a screen configuration of the copy application 306 is described.

Figure 7:
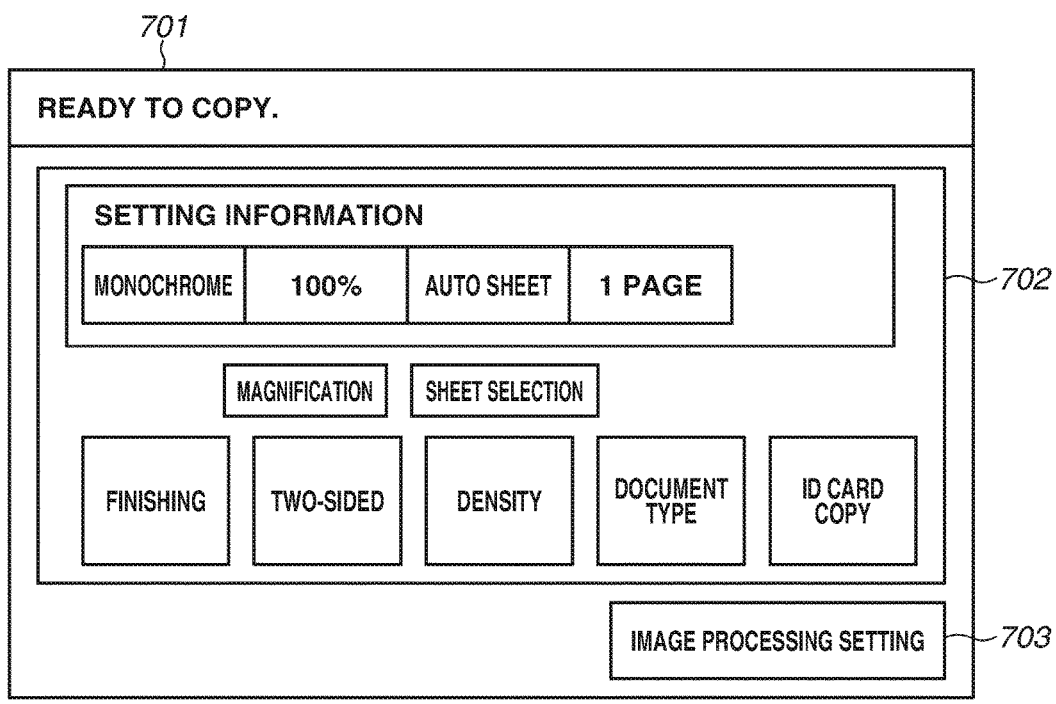
FIG. 7 illustrates a main screen of a copy application according to one embodiment.

FIG. 7 illustrates an example of a main screen 701 of the copy application 306. A main setting screen 702 is an example of the main setting screen 405 illustrated in FIG. 4 and a setting screen specialized for the copy application 306. The main setting screen 702 is a screen for performing a setting specialized for a copy job such as a magnification setting and a copy number setting of print. An image processing setting button 703 is a button for displaying a screen (the image processing setting screen 404) for setting image processing to a copy job.

Figure 8:
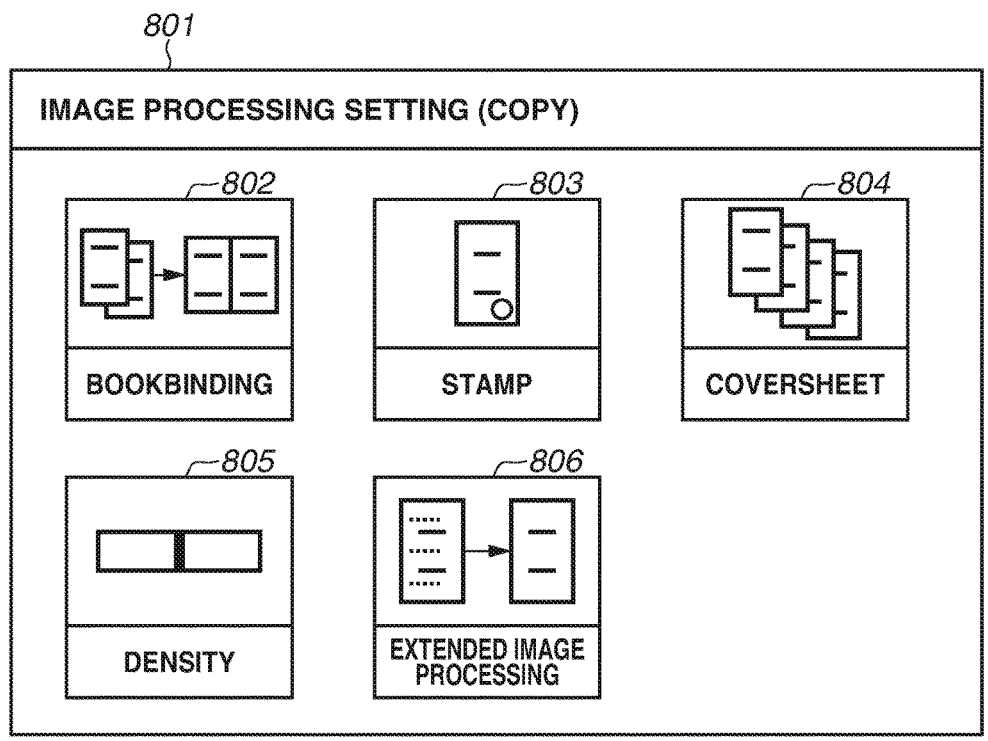
FIG. 8 illustrates an image processing setting screen according to one embodiment.

FIG. 8 illustrates an example of a setting screen 801. The setting screen 801 is displayed after pressing of the image processing setting button 703. The setting screen 801 is a setting screen shifted from the main menu screen 601 after the device control application is selected via the main menu screen 601. On the setting screen 801, a user interface corresponding to the image processing plug-in application is displayed based on the screen information 327. The setting screen 801 is an example of the image processing setting screen 404.

The setting screen 801 displays image processing icons 802, 803, 804, 805, and 806 for setting respective image processings. The image processing icons 802, 803, 804, and 805 are icons for selecting the image processing included in the image processing setting screen 404 regarding the copy application 306. An extended image processing icon 806 is the image processing icon 501 of the image processing plug-in application 303 which is added as the plug-in. The extended image processing icon 806 is a user interface corresponding to the image processing plug-in application. When the extended image processing icon 806 is selected, an individual setting screen 901 is displayed for setting whether to enable extension of a function by the image processing plug-in application. The image processing icons 802 to 805 included in the screen information 323 of the copy application 306 and the extended image processing icon 806 included in the screen information 327 of the image processing plug-in application 303 are arranged on the same setting screen 801. Therefore, a setting of the image processing added as the plug-in can be performed in a normal screen (the device control application screen 401) of the device control application 304. FIG. 8 illustrates an example in which an extended image processing icon 806 is displayed. In the example illustrated in FIG. 8, the number of the extended image processing icons 806 arranged on the setting screen 801 is the same number of the image processing plug-in applications 303 installed in the image forming apparatus 101.

Figure 9:
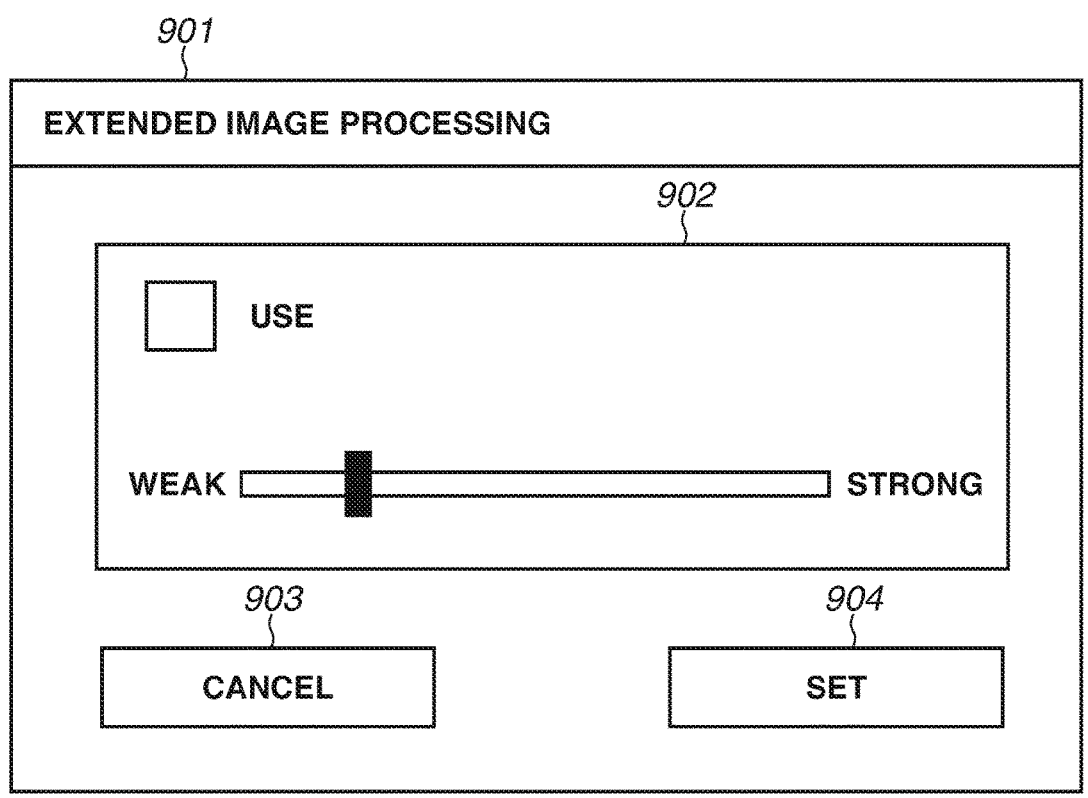
FIG. 9 illustrates an individual setting screen of extended image processing according to one embodiment.

FIG. 9 illustrates an example of the individual setting screen 901 of extended image processing. The individual setting screen 901 of the extended image processing is displayed when the CPU 211 detects pressing of the extended image processing icon 806. The individual setting screen 901 of the extended image processing is an example of the image processing setting screen 502 to the image processing plug-in application 303 added as the plug-in. The individual setting screen 901 of the extended image processing includes a setting portion 902, a cancel button 903, and a setting button 904. On the setting portion 902, a setting of the image processing (the extended image processing) added as the plug-in is performed. In the example illustrated in FIG. 9, a check box, a bar icon, and the like necessary for the setting are displayed on the setting portion 902. The cancel button 903 is used for cancelling an item input to the setting portion 902. The setting button 904 is used for setting the item input to the setting portion 902

In the example illustrated in FIG. 8, for example, the setting screen 801 is displayed, and thus, an example of first display processing is realized for displaying a first screen for selecting processing necessary for executing a job. Further, for example, an example of information pieces for selecting the first processing is realized by the image processing icons 802 to 805. Further, for example, an example of information for selecting the second processing is realized by the extended image processing icon 806. In the example illustrated in FIG. 9, for example, the individual setting screen 901 of the extended image processing is displayed, and thus an example of second display processing is realized for displaying the second screen for performing the setting regarding the second processing executed using the third application.

Figure 10:
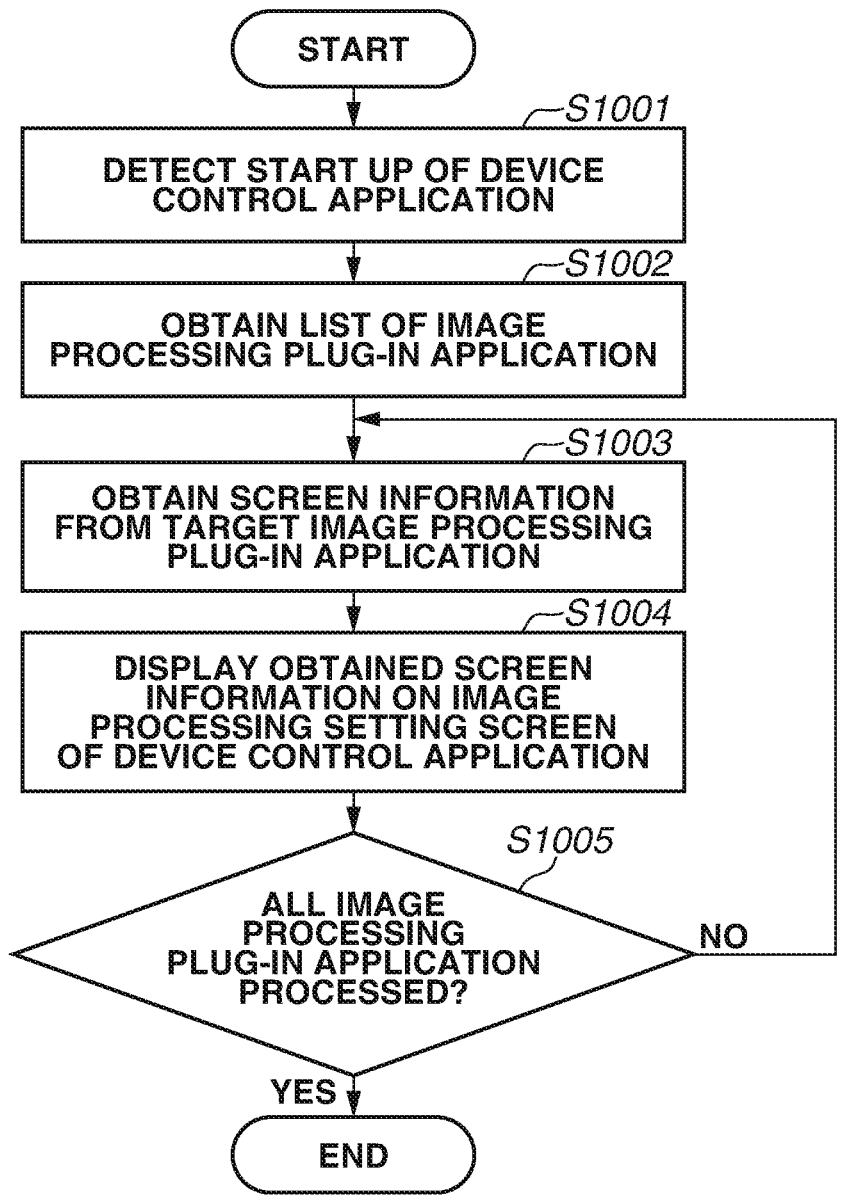
FIG. 10 is a flowchart illustrating first processing of the image forming apparatus according to one embodiment.

FIG. 10 is a flowchart illustrating an example of processing of the image forming apparatus 101 which is performed when the device control application 304 is started up. The example of processing of the image forming apparatus 101 when the device control application 304 is started up is described using the copy application 306 as an example of the device control application 304. A program related to processing in the present flowchart is stored in the HDD 213 of the image forming apparatus 101, read by the RAM 212, and executed by the CPU 211.

In step S1001, in the case that the copy application 306 detects start-up of itself, the copy application 306 calls the API of the connection library 314. Then, in step S1002, the copy application 306 obtains the list of the image processing plug-in applications 303 including the screen information 327. Next, in step S1003, the CPU 211 obtains the screen information 327 from the target image processing plug-in application 303. The target image processing plug-in application 303 is the image processing plug-in application 303 at the head of unselected image processing plug-in applications 303 included in the list of the image processing plug-in applications 303.

Next, in step S1004, the CPU 211 displays the screen information 327 obtained in step S1003 on the setting screen 801. In addition, the CPU 211 generates display data of the image processing setting screen 502 regarding the image processing plug-in application 303 having the image processing setting screen 502. Accordingly, the CPU 211 can call the image processing setting screen 502 immediately when detecting pressing of the extended image processing icon 806.

Next, in step S1005, the CPU 211 determines whether the processing in steps S1003 and step S1004 is performed with respect to all of the image processing plug-in applications 303 included in the list obtained in step S1002. As a result of the determination, in the case that the processing is not performed on all of the image processing plug-in applications 303 included in the list obtained in step S1002 (NO in step S1005), the processing returns to step S1003. Subsequently, the processing in steps S1003 to step S1005 is repeated until the processing is performed on all of the image processing plug-in applications 303 included in the list obtained in step S1002.

In the case that the processing is performed on all of the image processing plug-in applications 303 included in the list obtained in step S1002 (YES in step S1005), the processing in the flowchart in FIG. 10 is terminated. In the example illustrated in FIG. 8, the CPU 211 displays the image processing icons 802 to 805 and the extended image processing icon 806 included in the screen information 323 of the copy application 306 on the setting screen 801 of the copy application 306. As described above, the extended image processing icon 806 is an example of the image processing icon 501 included in the screen information 327 of the image processing plug-in application 303.

According to the above-described processing, the image processing icon 501 (906) of the image processing plug-in application 303 can be inserted into the image processing setting screen 404 (801) of the copy application 306. The image processing setting screen may be generated at a timing such as when the image forming apparatus 101 is started up, and when pressing of the image processing setting button 703 is detected in addition to when the device control application 304 is started up.

Next, an example of processing of the image forming apparatus 101 is described which is performed when the image processing realized by the device control application 304 is set. The example of processing of the image forming apparatus 101 when setting the image processing realized by the device control application 304 is described using the copy application 306 as an example of the device control application 304.

When an operation by a user to the main setting screen 702 on the main screen 701 of the copy application 306 is detected, the CPU 211 writes a content of setting based on the operation in the RAM 212 as setting information. The screen may be shifted to another screen in response to pressing of a button on the main setting screen 702, and the setting may be performed based on an operation performed on the another screen. When pressing of the image processing setting button 703 is detected, the CPU 211 displays the setting screen 801 of the copy application 306. Subsequently, when pressing of any of the image processing icons 802 to 805 and the extended image processing icon 806 is detected, the CPU 211 determines whether the individual setting screen exists for the image processing associated with the icon which is detected as being pressed. The individual setting screen is a screen on which a detailed setting of each image processing can be performed. The individual setting screen includes the individual setting screen 901 of the extended image processing. The individual setting screen exists only when each image processing requires a detailed setting.

When determining that the individual setting screen does not exist with respect to the pressed icon, the CPU 211 sets the image processing name of the image processing associated with the pressed icon and writes the image processing name into the RAM 212. In the example illustrated in FIG. 8, when the individual setting screen does not exist to the icon pressed on the setting screen 801, the image processing name associated with the screen information including the relevant icon is assigned to the setting information with respect to the copy job. On the other hand, when determining that the individual setting screen exists with respect to the pressed icon, the CPU 211 displays the individual setting screen. When the case that the extended image processing icon 806 is pressed is described as an example, the CPU 211 displays the individual setting screen 901 of the extended image processing. Subsequently, when an operation by a user to the setting portion 902 is detected, the CPU 211 writes a content of the setting based on the operation in the RAM 212 as the setting information.

When pressing of the cancel button 903 is detected, the CPU 211 discards the setting information written in the RAM 212 and displays the setting screen 801. On the other hand, when pressing of the setting button 904 is detected, the CPU 211 reads the setting information written in the RAM 212. Subsequently, the CPU 211 sets the image processing name of the image processing associated with the icon pressed on the setting screen 801 and writes the setting information in the RAM 212. For example, when the extended image processing icon 806 included in the screen information 327 is pressed, the image processing name 321 associated with the relevant screen information 327 is assigned to the setting information with respect to the copy job. Further, the CPU 211 displays the setting screen 801. In this regard, it is desirable that the operation unit 204 changes a color or displays in an enabled state so that a user can recognize that the image processing specified by the user is enabled. The user performs the above-described operations until the desired setting is completed. The CPU 211 additionally writes the setting information in the RAM 212 in each time. In other words, when a user sets a plurality of the image processings, a plurality of the image processing names is set. In the example illustrated in FIG. 8, when two or more icons are pressed in the image processing icons 802 to 805 and the extended image processing icon 806, the image processing names associated with the screen information pieces including the pressed icons are respectively set. In this regard, a plurality of the extended image processing icons 806 may be pressed in some cases.

Figure 11:
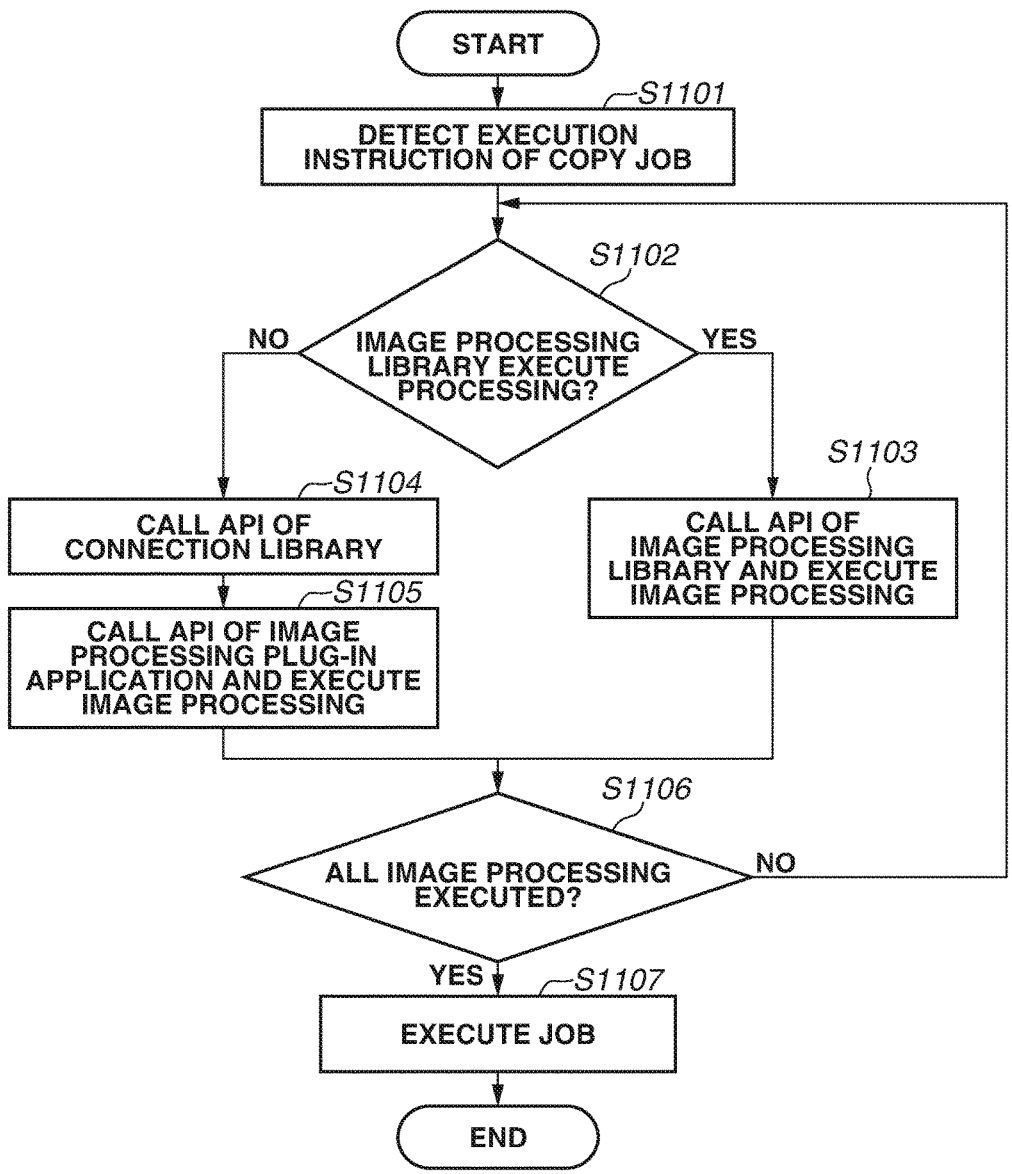
FIG. 11 is a flowchart illustrating second processing of the image forming apparatus according to one embodiment.

Next, an example of processing of the image forming apparatus 101 when executing a job is described using the copy application 306 as an example. FIG. 11 is a flowchart illustrating the example of processing of the image forming apparatus 101 when executing a job. A program related to processing in the present flowchart is stored in the HDD 213 of the image forming apparatus 101, read by the RAM 212, and executed by the CPU 211.

First, in step S1101, in the case that an execution instruction of a copy job is detected, the copy application 306 calls the API of the copy library 311. Further, the copy library 311 instructs the scanner control driver 318 to perform scan. The scanner control driver 318 transmits scanned image data from the scanner 203 to the copy library 311.

In step S1102, the copy library 311 obtains the setting information with respect to the unselected image processing from among the setting information pieces set by the copy application 306 from the RAM 212. Further, the copy library 311 determines whether the image processing library 315 can execute the image processing specified by the obtained setting information. Specifically, the copy library 311 performs the determination in step S1102 by inquiring of the image processing library 315 about whether there is the image processing library 315 having the image processing name 326 which is the same as the image processing name included in the setting information obtained from the RAM 212.

When it is determined that the image processing library 315 can execute the image processing (YES in step S1102), then in step S1103, the copy library 311 calls the API of the image processing library 315 and causes the image processing library 315 to execute the image processing. In this regard, the image processing library 315 reflects the setting information set in the copy application 306 to each image processing.

When it is determined that the image processing library 315 cannot execute the image processing (NO in step S1102), then in step S1104, the copy library 311 calls the API of the connection library 314. The connection library 314 searches for the image processing plug-in application 303 having the image processing name 321 equivalent to the image processing name included in the setting information obtained from the RAM 212. In step S1105, the connection library 314 calls the API of the searched image processing plug-in application 303 and causes the image processing plug-in application 303 to execute the image processing. In this regard, the image processing plug-in application 303 reflects the setting information set in the copy application 306 to each image processing.

In step S1106, the copy library 311 determines whether the above-described processing in steps S1102 to S1105 is performed on all of the image processings set on the setting screen 801. As a result of the determination, in the case that the processing in steps S1102 to S1105 is not performed on all of the image processings set on the setting screen 801 (NO in step S1106), the processing returns to step S1102. The processing in steps S1102 to S1105 is repeated until the processing in steps S1102 to S1105 is performed on all of the image processings set on the setting screen 801.

When the processing in steps S1102 to S1105 is performed on all of the image processings set on the setting screen 801 (YES in step S1106), the copy library 311 transmits a print instruction to the printer control driver 317. In step S1107, the printer control driver 317 transmits the print instruction to the printer 202 via the printer I/F 215. The printer 202 executes printing based on the print instruction. Accordingly, the copy job is completed. In the example illustrated in FIG. 11, for example, an example of job execution processing for executing a job is realized by using the copy library 311 and the printer control driver 317.

FIGS. 7 to 11 illustrate using examples a case where the screen information for enabling the image processing plug-in application 303 is added to the copy application 306. The screen information enabling the image processing plug-in application 303 can be added to another application included in the device control application 304 as with the copy application 306. Thus, a case is described below in which the screen information for enabling a new file format is added using the scan transmission application 308 as a specific example.

Figure 12:
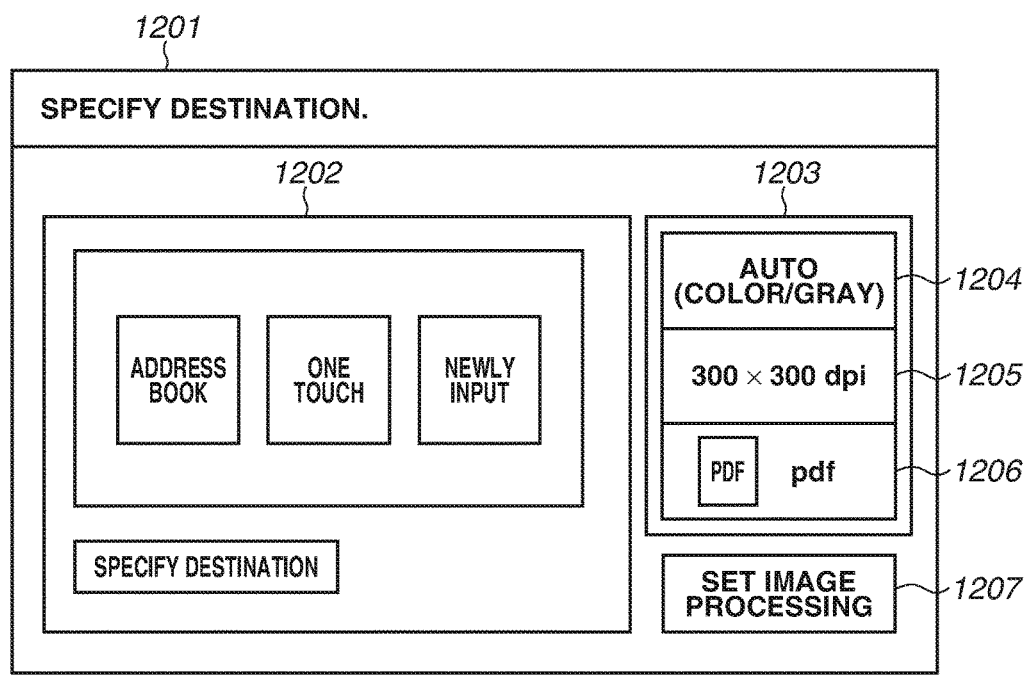
FIG. 12 illustrates a main screen of a scan transmission application according to one embodiment.

First, a specific example of the screen information 325 of the scan transmission application 308 is described. FIG. 12 illustrates an example of a main screen 1201 of the scan transmission application 308. The main screen 1201 is an example of the main screen 403 illustrated in FIG. 4. The main screen 1201 includes a transmission destination specifying screen 1202, a transmission image setting screen 1203, and an image processing setting button 1207 as the main setting screen 405.

On the transmission destination specifying screen 1202, information of a device to which the image data scanned by the scanner 203 is transmitted via the network I/F 214 is input. Specifically, for example, an Internet protocol (IP) address, an Email address, and the like are specified on the transmission destination specifying screen 1202.

The transmission image setting screen 1203 includes a color/monochrome setting button 1204, a resolution setting button 1205, and a transmitting image format setting button 1206. The color/monochrome setting button 1204 is used to set a color of a transmitting image. As a specific example, the color/monochrome setting button 1204 is used to select a color from automatic, full color, gray scale, and black-and-white binary. "Automatic" represents a mode in which the CPU 211 automatically detects a color combination of an image scanned by the scanner 203 and automatically set the color. The resolution setting button 1205 is used to select resolution of the transmitting image. Specifically, the resolution setting button 1205 is used to select the resolution from 100*100 dpi (dot per inch), 300*300 dpi, 600*600 dpi, and others. The transmitting image format setting button 1206 is used to set a format of the transmitting image. The transmission destination specifying screen 1202 and the transmission image setting screen 1203 may be configured to, when a button displayed thereon is pressed, display a screen for performing relevant settings and receive an input from a user on the screen. The image processing setting button 1207 is a button for displaying the image processing setting screen 404 as with the image processing setting button 703 illustrated in FIG. 7.

Figure 13:
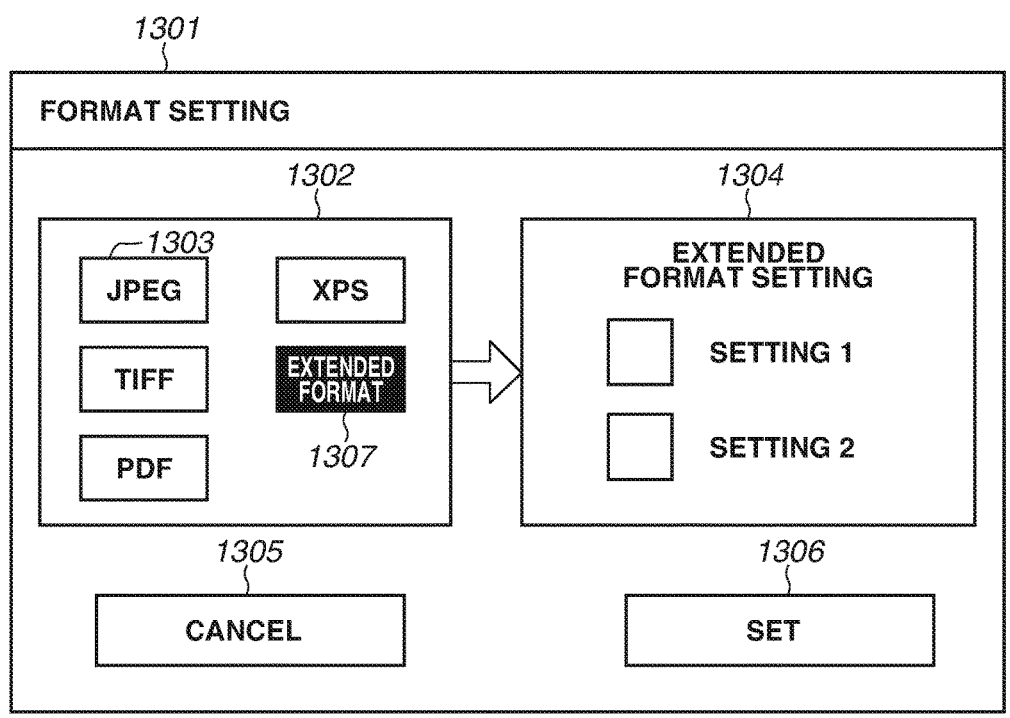
FIG. 13 illustrates a format setting screen according to one embodiment.

FIG. 13 illustrates an example of a format setting screen 1301. The format setting screen 1301 is displayed when the CPU 211 detects pressing of the transmitting image format setting button 1206. The format setting screen 1301 includes a format selection screen 1302, a selected format detail setting screen 1304, a cancel button 1305, and a setting button 1306. On the format selection screen 1302, a format of the transmitting image can be selected by pressing a format button 1303. Specifically, on the format selection screen 1302, a format of the transmitting image is selected from formats such as Portable Document Format (PDF), Joint Photographic Experts Group (JPEG), Tagged Image File Format (TIFF), and Extensible Markup Language (XML) paper specification (XPS). It is desirable that the format buttons 1303 and 1307 selected on the format selection screen 1302 are displayed with color or in an enabled state so that a user can recognize that the image processing specified by the user is enabled.

On the selected format detail setting screen 1304, detailed settings can be performed on the format selected on the format selection screen 1302. The format selection screen 1302 can display a setting screen of the format dynamically selected by pressing the format buttons 1303 and 1307. When the format selected by pressing the format buttons 1303 and 1307 does not include the detailed setting, such a setting screen is not displayed. The cancel button 1305 is used to cancel the setting on the format selection screen 1302 and the selected format detail setting screen 1304. The setting button 1306 is used to enable the setting on the format selection screen 1302 and the selected format detail setting screen 1304.

Subsequently, an example of processing of the image forming apparatus 101 is described which is performed for displaying the screen information for enabling a new file format. FIG. 14 is a flowchart illustrating the example of processing of the image forming apparatus 101 when the scan transmission application 308 is started up. A program related to processing in the present flowchart is stored in the HDD 213 of the image forming apparatus 101, read by the RAM 212, and executed by the CPU 211.

In step S1401, in the case that the scan transmission application 308 detects start-up of itself, the scan transmission application 308 calls the API of the connection library 314. Then, in step S1402, the scan transmission application 308 obtains the list of the image processing plug-in applications 303 including the screen information 327. Next, in step S1403, the CPU 211 obtains the screen information 327 from the target image processing plug-in application 303. The target image processing plug-in application 303 is the image processing plug-in application 303 at the head of unselected image processing plug-in applications 303 included in the list of the image processing plug-in applications 303.

Next, in step S1404, the CPU 211 determines whether the target image processing plug-in application 303 is an application for extending a format. Specifically, the screen information 327 of the image processing plug-in application 303 includes respective format extension screen information and extended image processing screen information in separated forms. The CPU 211 performs the determination in step S1404 by determining which information is included in the screen information 327 of the target image processing plug-in application 303. The determination method in step S1404 may also be a method other than that described above.

As a result of the determination in step S1404, if the target image processing plug-in application 303 is the application for extending a format (YES in step S1404), the processing proceeds to step S1405. In step S1405, the CPU 211 displays the screen information 327 obtained in step S1403 on the format selection screen 1302. The display in step S1405 represents generating a screen on a background, and the processing is not practically executed until pressing of the transmitting image format setting button 1206 is detected. Specifically, the CPU 211 obtains the image processing icon 501 from the screen information 327 obtained in step S1403. Further, the CPU 211 displays the obtained image processing icon 501 as an extended format button 1307 on the format selection screen 1302 in the format setting screen 1301 alongside of the format button 1303. FIG. 13 illustrates an example in which characters of "extended format" are displayed on the extended format button 1307. However, it does not always have to be arranged in this way. For example, the CPU 211 may obtain the image processing name 321 from the image processing plug-in application 303 obtained in step S1402 and display the obtained image processing name 321 instead of "extended format". By the above-described processing in step S1405, a user can select regardless of the existing format button 1303 and the extended format button 1307 on the format selection screen 1302. Further, the CPU 211 determines whether the image processing setting screen 502 is included in the screen information 327. In the case that the image processing setting screen 502 is included in the screen information 327, the CPU 211 displays the selected format detail setting screen 1304 for setting each extended format on the format selection screen 1302. In FIG. 13, a color of the extended format button 1307 is inverted and displayed so as to explicitly indicate that the extended format is selected in response to an operation at the operation unit 204 by a user.

In step S1404, if it is determined that the target image processing plug-in application 303 is not the application for extending a format (NO in step S1404), the CPU 211 advances the processing to step S1406. In this case, the CPU 211 determines that the target image processing plug-in application 303 is an application for the extended image processing. Subsequently, in step S1406, the CPU 211 displays the screen information 327 obtained in step S1402 on the image processing setting screen 404 of the scan transmission application 308. The image processing setting screen 404 of the scan transmission application 308 and the setting screen 801 of the copy application 306 have the same configuration but are not shared. Therefore, when the image processing setting button 1207 is pressed, the screen having the same configuration as the setting screen 801 is displayed, and a setting of the image processing which can be processed by the scan transmission application 308 can be performed.

In step S1407, the CPU 211 determines whether the processing in steps S1403 to S1406 is performed with respect to all of the image processing plug-in applications 303 included in the list obtained in step S1402. As a result of the determination, in the case that the processing is not performed on all of the image processing plug-in applications 303 included in the list obtained in step S1402 (NO in step S1407), the processing returns to step S1403. Subsequently, the processing in steps S1403 to step S1407 is repeated until the processing is performed on all of the image processing plug-in applications 303 included in the list obtained in step S1402. In the case that the processing is performed on all of the image processing plug-in applications 303 included in the list obtained in step S1402 (YES in step S1407), the processing in the flowchart in FIG. 14 is terminated.

According to the above-described processing, the image forming apparatus 101 can use the image processing plug-in application 303 from the screen information 325 of the scan transmission application 308. Processing and a job execution flow for enabling the execution of the image processing plug-in application 303 itself in response to an operation on the operation unit 204 by a user are the same as those in the case of the copy application 306, and thus the detailed descriptions thereof are omitted.

In the example illustrated in FIG. 13, for example, the format setting screen 1301 is displayed, and thus an example of the first display processing is realized for displaying the first screen for selecting processing necessary to execute a job. For example, an example of information for selecting the first processing can be realized by the format button 1303. Further, for example, an example of information for selecting the second processing can be realized by the extended format button 1307. In the example illustrated in FIG. 13, for example, the selected format detail setting screen 1304 is displayed, and thus an example of the second display processing is realized for displaying the second screen for performing the setting regarding the second processing executed using the third application.

As described above, according to the present exemplary embodiment, the image forming apparatus 101 displays a screen for selecting an application corresponding to an icon selected on the main menu screen 601. For example, the image forming apparatus 101 displays the setting screen 801 as a screen for selecting the copy application 306. The setting screen 801 displays the image processing icons 802 to 805 for selecting the existing applications and the extended image processing icon 806 for selecting the application added as the plug-in. Therefore, the icon for enabling the image processing plug-in application 303 can be inserted into the screen while maintaining the screen configuration of the existing device control application 304. Further, the icon is operated, and thus a setting screen (the individual setting screen 901 of the extended image processing and the like) with respect to the image processing plug-in application 303 can be displayed. As described above, according to the present exemplary embodiment, selection of the new image processing added as the plug-in and selection of the existing image processing can be executed on the same screen (the setting screen 801 and the like). Accordingly, a user does not have to consciously use differently the new image processing added as a plug-in and the existing image processing. Thus, user convenience can be improved compared to a conventional case in which the new image processing is executed from a plug-in application for executing a job including the new image processing.

Next, a second exemplary embodiment is described. To illustrate the first exemplary embodiment, a case is described as an example in which all of the image processing plug-in applications 303 registered in the image forming apparatus 101 can be enabled from the image processing setting screen 404. However, the settable device control application 304 may differs based on image processing plug-in application 303 to which the device control application 304 is set. Thus, according to the present exemplary embodiment, a case is described in which the image processing plug-in application 303 to be enabled is selected. Accordingly, the present exemplary embodiment is the one obtained by adding processing for selecting the image processing plug-in application 303 to the first exemplary embodiment. Thus, portions identical to those of the first exemplary embodiment are denoted by the same reference numerals used in FIGS. 1 to 14, and detailed descriptions thereof are omitted from the description of the present exemplary embodiment for ease of description.

Table 1 represents an example of a relationship that a setting of the image processing plug-in application 303 can have or not have in each of the device control applications 304.

TABLE 1

|  | print application | copy application | available job list |
|---|---|---|---|
| OCR automatic translation | ○ | ○ | "Print" "Copy" |
| tilt correction | X | ○ | "Copy" |

In Table 1, OCR automatic translation is an example of the image processing executed by the image processing plug-in application 303. The OCR automatic translation is the image processing which extracts character information from image data scanned by the scanner 203 and image data stored in the HDD 213 of the image forming apparatus 101 and translates the character information. Thus, the OCR automatic translation is the image processing which can be used from any of the print application 305 and the copy application 306. The tilt correction is processing for detecting and correcting a tilt if an image is tilted. Therefore, the tilt correction is not necessary for the device control application 304 to execute a job which does not need the scanner 203 and the like. In the case of the example in Table 1, it is desirable that the tilt correction is set in the copy application 306. On the other hand, the tilt correction is not necessary in the print application 305 since the scanner 203 is not used therein. Accordingly, it is desirable that the tilt correction is not set. Thus, according to the present exemplary embodiment, the device control application 304 which explicitly permits enabling is specified at the image processing plug-in application 303.

To each of the image processing plug-in applications 303, an available job list is registered which indicates job names of the device control application 304 which can use the image processing plug-in application 303. In Table 1, character strings "Print" and "Copy" are set as job names of the device control application 304 in the available job list with respect to the image processing plug-in application 303 executing the OCR automatic translation. On the other hand, only the character string "Copy" is set as the job name of the device control application 304 in the available job list with respect to the image processing plug-in application 303 executing the tilt correction.

A method for registering the available job list may include a method for registering the available job list when each of the image processing plug-in applications 303 is installed, however, another method for registering the available job list may also be adopted. The case in which a character string is registered in the available job list is described, however, information registered in the available job list may be other than a character string.

According to the present exemplary embodiment, for example, the available job list is stored in the HDD 213, and thus an example of fourth storing processing is realized. In other embodiments, the information may be stored in a storage medium or a storage device other than the HDD 213.

Next, an example of processing of the image forming apparatus 101 when the device control application 304 is started up is described. FIG. 15 is a flowchart illustrating the example of processing of the image forming apparatus 101 when the device control application 304 is started up. In the flowchart in FIG. 15, the available job list is considered which is not considered in the flowchart in FIG. 1. A program related to processing in the present flowchart is stored in the HDD 213 of the image forming apparatus 101, read by the RAM 212, and executed by the CPU 211.

In step S1501, in a case where each of the device control applications 304 detects start-up of itself, the device control application 304 calls the API of the connection library 314. In this regard, the device control application 304 transmits the job name of itself to the connection library 314. Accordingly, in step S1502, the device control application 304 obtains the list of the image processing plug-in applications 303 in which the screen information 327 is included and the job name of the device control application 304 itself is described in the available job list. For example, in the case that the device control application 304 started up is the print application 305 in Table 1, a list in which only an OCR automatic translation plug-in application is inserted is obtained as the list of the image processing plug-in applications 303. On the other hand, in the case that the device control application 304 started up is the copy application 306, a list in which the OCR automatic translation plug-in application and a tilt correction plug-in application are included is obtained. According to the present exemplary embodiment, for example, the device control application 304 obtains the list of the image processing plug-in applications 303 in which the job name of itself is included in the available job list from the connection library 314, and thus an example of specifying processing is realized.

According to the above-described processing, the list of the image processing plug-in applications 303 includes only the image processing plug-in application 303 which can be used by each device control application 304. The processing in steps S1503, S1504, and S1505 are respectively similar to the processing in step S1003, S1004, and S1005 in FIG. 10, and thus the detailed descriptions thereof are omitted.

As described above, according to the present exemplary embodiment, each of the device control applications 304 can insert only the image processing plug-in application 303 which can be used by itself into the screen information 327 of itself.

The exemplary embodiments described above are merely examples for implementing various embodiments of the present disclosure. Therefore, the examples should not be construed as restrictively limiting the technical scope of the present disclosure. In other words, the present disclosure can be implemented in various other forms without departing from the technical idea and/or the main features thereof.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments have been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-146610, filed Jul. 26, 2016 which is hereby incorporated by reference herein in its entirety.

What is claimed is:

1. An image forming apparatus comprising:
   a storage configured to store a plurality of device control applications that cause the image forming apparatus to execute a job, wherein each of the plurality of device control applications includes screen information relating to a user interface to be displayed on a display;
   a memory device that stores a set of instructions; and
   at least one processor that executes the instructions to:
   control the storage to store an image processing plug-in application that is a plug-in application for extending two or more of the device control applications,
   wherein the image processing plug-in application includes screen information relating to the user interface to be displayed on the display, the screen information regarding an image processing function to be extended by the image processing plug-in application, and
   wherein the storage is configured to store correspondence information specifying a device control application capable of using the image processing plug-in application, from among the plurality of device control applications;
   detect startup of a device control application;
   identify, based on the correspondence information, an image processing plug-in application which the detected device control application is able to extend; and
   generate a display screen based on screen information of the identified image processing plug-in application and screen information of the device control application.

2. The image forming apparatus according to claim 1, wherein the at least one processor executes the instructions stored in the memory device to:

display a selection screen for selecting the device control application capable of using the image processing plug-in application; and display, on a setting screen that replaces the selection screen after the device control application is selected via the selection screen, a user interface corresponding to the image processing plug-in application, the user interface based at least in part on the screen information, wherein the setting screen is for setting one or more image processing parameters of the device control application selected via the selection screen.

3. The image forming apparatus according to claim 2, wherein the at least one processor executes the instructions stored in the memory device to:

display a screen for setting whether to enable extension of a function by the image processing plug-in application based on a user interface item that is selected.

4. The image forming apparatus according to claim 2, wherein the at least one processor executes the instructions stored in the memory device to:

store a local function plug-in application that operates separately from the device control application in the storage; and display a user interface item corresponding to the local function plug-in application on the selection screen for selecting a device control application.

5. The image forming apparatus according to claim 1, wherein the device control application capable of using the image processing plug-in application is any of a print application, a copy application, a scan storage application, or a scan transmission application.

6. The image forming apparatus according to claim 2, wherein the image processing plug-in application executes any of processing including format conversion, tilt correction, or generation of translation data after optical character recognition (OCR), with respect to an input image in association with execution of processing by the device control application selected via the selection screen.

7. A method for controlling an image forming apparatus that stores a plurality of device control applications, the method comprising:

controlling a storage to store an image processing plug-in application that is a plug-in application for extending two or more of the device control applications, wherein the storage is configured to store a plurality of device control applications that cause the image forming apparatus to execute a job, each of the plurality of device control applications including screen information relating to a user interface to be displayed on a display;

displaying a selection screen for selecting a device control application;

displaying, on a setting screen that replaces the selection screen after a first device control application is selected via the selection screen, a user interface corresponding to the image processing plug-in application, wherein the image processing plug-in application includes screen information relating to the user interface to be displayed on the display, the screen information regarding an image processing function to be extended by the image processing plug-in application, and wherein the user interface is displayed based on the screen information, and wherein the storage is configured to store correspondence information specifying a device control application capable of using the image processing plug-in application, from among the plurality of device control applications;

detecting startup of a device control application;

identifying, based on the correspondence information, an image processing plug-in application which the detected device control application is able to extend; and generating a display screen based on screen information of the identified image processing plug-in application and screen information of the device control application.

8. A non-transitory computer readable storage medium storing instructions which, when executed, cause an image forming apparatus that stores a plurality of device control applications to execute:

a control procedure for controlling a storage to store an image processing plug-in application that is a plug-in application for extending two or more of the device control applications, wherein the storage is configured to store a plurality of device control applications that cause the image forming apparatus to execute a job, each of the plurality of device control applications including screen information relating to a user interface to be displayed on a display;

a display control procedure for displaying a selection screen for selecting a device control application;

a display control procedure for displaying, on a setting screen that replaces the selection screen after a first device control application is selected via the selection screen, a user interface corresponding to the image processing plug-in application, wherein the image processing plug-in application includes screen information relating to the user interface to be displayed on the display, the screen information regarding an image processing function to be extended by the image processing plug-in application, and wherein the user interface is displayed based on the screen information, and wherein the storage is configured to store correspondence information specifying a device control application capable of using the image processing plug-in application, from among the plurality of device control applications;

a detecting procedure for detecting startup of a device control application;

an identification procedure for identifying, based on the correspondence information, an image processing plug-in application which the detected device control application is able to extend; and a generating procedure for generating a display screen based on screen information of the identified image processing plug-in application and screen information of the device control application.

* * * * *